(12) United States Patent
Veloso et al.

(10) Patent No.: US 12,271,848 B2
(45) Date of Patent: *Apr. 8, 2025

(54) SYSTEMS AND METHODS FOR RECOMMENDING RULES FOR ROUTING CALLS

(71) Applicant: Talkdesk, Inc., San Francisco, CA (US)

(72) Inventors: António Veloso, Lisbon (PT); Alexandre Pinheiro, Lisbon (PT)

(73) Assignee: Talkdesk, Inc., San Francisco, CA (US)

( * ) Notice: Subject to any disclaimer, the term of this patent is extended or adjusted under 35 U.S.C. 154(b) by 997 days.

This patent is subject to a terminal disclaimer.

(21) Appl. No.: 16/666,496

(22) Filed: Oct. 29, 2019

(65) Prior Publication Data

US 2021/0125116 A1    Apr. 29, 2021

(51) Int. Cl.
*H04M 3/00* (2024.01)
*G06F 16/909* (2019.01)
(Continued)

(52) U.S. Cl.
CPC ....... *G06Q 10/0633* (2013.01); *G06F 16/909* (2019.01); *G06Q 10/06312* (2013.01);
(Continued)

(58) Field of Classification Search
CPC ............. H04M 3/5175; H04M 3/5233; H04M 3/5191; H04M 3/5166; H04M 3/5237;
(Continued)

(56) References Cited

U.S. PATENT DOCUMENTS 5,862,203 A    1/1999  Wulkan et al.
5,970,124 A   10/1999  Csaszar et al.
(Continued)

FOREIGN PATENT DOCUMENTS

EP    1418519 A1    5/2004
WO    2006037836 A1    4/2006
(Continued)

OTHER PUBLICATIONS

Aksin et al., "The Modern Call Center: A Multi-Disciplinary Perspective on Operations Management Research", Production and Operations Management, 2007, vol. 16, No. 6, pp. 665-688.
(Continued)

*Primary Examiner* — Kharye Pope
(74) *Attorney, Agent, or Firm* — Potomac Law Group, PLLC; Marc S. Kaufman

(57) ABSTRACT

In one embodiment, an entity such as a company may desire to use agents associated with a contact center to handle calls for the company. The company may identify customer categories for the calls such as technical support and billing. Rather than have the company create the rules that are used to select agents to handle calls for each category, the contact center may use historical call data, such as performance metrics and customer satisfaction survey information, to recommend rules to the company for each category. The recommended rules may also be based on the specific industry, field, or sector associated with the company.

17 Claims, 5 Drawing Sheets

(51) Int. Cl.
  *G06Q 10/0631* (2023.01)
  *G06Q 10/0633* (2023.01)
  *G06Q 10/0639* (2023.01)
  *G06Q 10/1093* (2023.01)
  *G06Q 30/016* (2023.01)
  *H04L 12/66* (2006.01)
  *H04M 3/436* (2006.01)
  *H04M 3/51* (2006.01)
  *H04M 3/523* (2006.01)
  *H04M 5/00* (2006.01)

(52) U.S. Cl.
  CPC ... *G06Q 10/06393* (2013.01); *G06Q 10/1097* (2013.01); *G06Q 30/016* (2013.01); *H04M 3/4365* (2013.01); *H04M 3/5183* (2013.01); *H04M 3/5232* (2013.01); *H04M 3/5233* (2013.01)

(58) Field of Classification Search
  CPC ............. H04M 3/4933; H04M 3/5183; H04M 2201/42; H04M 2203/254; H04M 2242/14; H04M 3/5232; H04M 2203/402; H04M 3/5235; H04M 3/523; H04M 7/006; G06F 3/04817; G06F 3/0482; G06F 8/34
  USPC ............ 379/265.09, 265.12, 265.11, 265.13, 379/266.01, 265.02; 370/352
  See application file for complete search history.

(56) References Cited

U.S. PATENT DOCUMENTS

| | | | |
|---|---|---|---|
| 6,100,891 A | 8/2000 | Thorne | |
| 6,128,415 A | 10/2000 | Hultgren et al. | |
| 6,163,607 A | 12/2000 | Bogart et al. | |
| 6,230,197 B1 | 5/2001 | Beck et al. | |
| 6,263,057 B1 | 7/2001 | Silverman | |
| 6,411,687 B1 | 6/2002 | Bohacek et al. | |
| 6,587,831 B1 | 7/2003 | O'Brien | |
| 6,639,982 B1 | 10/2003 | Stuart et al. | |
| 6,754,333 B1 | 6/2004 | Flockhart et al. | |
| 6,970,829 B1 | 11/2005 | Leamon | |
| 7,023,979 B1 | 4/2006 | Wu et al. | |
| 7,076,047 B1 | 7/2006 | Brennan et al. | |
| 7,110,525 B1 | 9/2006 | Heller et al. | |
| 7,209,475 B1 | 4/2007 | Shaffer et al. | |
| 7,274,787 B1 | 9/2007 | Schoeneberger | |
| 7,343,406 B1 | 3/2008 | Buonanno et al. | |
| 7,372,952 B1 | 5/2008 | Wu et al. | |
| 7,409,336 B2 | 8/2008 | Pak et al. | |
| 7,426,268 B2 | 9/2008 | Walker et al. | |
| 7,466,334 B1 | 12/2008 | Baba | |
| 7,537,154 B2 | 5/2009 | Ramachandran | |
| 7,634,422 B1 | 12/2009 | Andre et al. | |
| 7,657,263 B1 | 2/2010 | Chahrouri | |
| 7,672,845 B2 | 3/2010 | Beranek et al. | |
| 7,676,034 B1 | 3/2010 | Wu et al. | |
| 7,698,163 B2 | 4/2010 | Reed et al. | |
| 7,752,159 B2 | 7/2010 | Nelken et al. | |
| 7,774,790 B1 | 8/2010 | Jirman et al. | |
| 7,788,286 B2 | 8/2010 | Nourbakhsh et al. | |
| 7,853,006 B1 | 12/2010 | Fama et al. | |
| 7,864,946 B1 | 1/2011 | Fama et al. | |
| 7,869,998 B1 | 1/2011 | Di et al. | |
| 7,949,123 B1 | 5/2011 | Flockhart et al. | |
| 7,953,219 B2 | 5/2011 | Freedman et al. | |
| 7,966,369 B1 | 6/2011 | Briere et al. | |
| 8,060,394 B2 | 11/2011 | Woodings et al. | |
| 8,073,129 B1 | 12/2011 | Kalavar | |
| 8,116,446 B1 | 2/2012 | Kalavar | |
| 8,135,125 B2 | 3/2012 | Sidhu et al. | |
| 8,160,233 B2 | 4/2012 | Keren et al. | |
| 8,223,951 B1 | 7/2012 | Edelhaus et al. | |
| 8,229,761 B2 | 7/2012 | Backhaus et al. | |
| 8,243,896 B1 | 8/2012 | Rae | |
| 8,300,798 B1 | 10/2012 | Wu et al. | |
| 8,369,338 B1 | 2/2013 | Peng et al. | |
| 8,370,155 B2 | 2/2013 | Byrd et al. | |
| 8,391,466 B1 | 3/2013 | Noble, Jr. | |
| 8,447,279 B1 | 5/2013 | Peng et al. | |
| 8,488,769 B1 | 7/2013 | Noble et al. | |
| 8,526,576 B1 * | 9/2013 | Deich | H04M 11/04 379/45 |
| 8,583,466 B2 | 11/2013 | Margulies et al. | |
| 8,594,306 B2 | 11/2013 | Laredo et al. | |
| 8,635,226 B2 | 1/2014 | Chang et al. | |
| 8,671,020 B1 | 3/2014 | Morrison et al. | |
| 8,688,557 B2 | 4/2014 | Rose et al. | |
| 8,738,739 B2 | 5/2014 | Makar et al. | |
| 8,767,948 B1 | 7/2014 | Riahi et al. | |
| 8,811,597 B1 | 8/2014 | Hackbarth et al. | |
| 8,861,691 B1 | 10/2014 | De et al. | |
| 8,898,219 B2 | 11/2014 | Ricci | |
| 8,898,290 B2 | 11/2014 | Siemsgluess | |
| 8,909,693 B2 | 12/2014 | Frissora et al. | |
| 8,935,172 B1 | 1/2015 | Noble et al. | |
| 9,020,142 B2 | 4/2015 | Kosiba et al. | |
| 9,026,431 B1 | 5/2015 | Moreno et al. | |
| 9,082,094 B1 | 7/2015 | Etter et al. | |
| 9,100,483 B1 | 8/2015 | Snedden | |
| 9,117,450 B2 | 8/2015 | Cook et al. | |
| 9,123,009 B1 | 9/2015 | Etter et al. | |
| 9,137,366 B2 | 9/2015 | Medina et al. | |
| 9,152,737 B1 | 10/2015 | Micali et al. | |
| 9,160,853 B1 | 10/2015 | Daddi et al. | |
| 9,185,222 B1 | 11/2015 | Govindarajan et al. | |
| 9,237,232 B1 | 1/2016 | Williams et al. | |
| 9,280,754 B1 | 3/2016 | Schwartz et al. | |
| 9,286,413 B1 | 3/2016 | Coates et al. | |
| 9,300,801 B1 | 3/2016 | Warford et al. | |
| 9,319,524 B1 | 4/2016 | Webster | |
| 9,386,152 B2 | 7/2016 | Riahi et al. | |
| 9,426,291 B1 | 8/2016 | Ouimette et al. | |
| 9,514,463 B2 | 12/2016 | Grigg et al. | |
| 9,609,131 B2 | 3/2017 | Placiakis et al. | |
| 9,674,361 B2 | 6/2017 | Ristock et al. | |
| 9,679,265 B1 | 6/2017 | Schwartz et al. | |
| 9,787,840 B1 | 10/2017 | Neuer et al. | |
| 9,823,949 B2 | 11/2017 | Ristock et al. | |
| 9,883,037 B1 | 1/2018 | Lewis et al. | |
| 9,894,478 B1 | 2/2018 | Deluca et al. | |
| 9,930,181 B1 | 3/2018 | Moran et al. | |
| 9,955,021 B1 * | 4/2018 | Liu | H04M 3/2218 |
| RE46,852 E | 5/2018 | Petrovykh | |
| 9,998,596 B1 | 6/2018 | Dunmire et al. | |
| 10,009,465 B1 | 6/2018 | Fang et al. | |
| 10,038,788 B1 * | 7/2018 | Khalatian | H04L 65/60 |
| 10,079,939 B1 | 9/2018 | Bostick et al. | |
| 10,115,065 B1 | 10/2018 | Fama et al. | |
| 10,154,138 B2 | 12/2018 | Te et al. | |
| 10,194,027 B1 | 1/2019 | Daddi et al. | |
| 10,235,999 B1 | 3/2019 | Naughton et al. | |
| 10,242,019 B1 | 3/2019 | Shan et al. | |
| 10,276,170 B2 | 4/2019 | Gruber et al. | |
| 10,331,402 B1 | 6/2019 | Spector et al. | |
| 10,380,246 B2 | 8/2019 | Clark et al. | |
| 10,440,180 B1 | 10/2019 | Jayapalan et al. | |
| 10,445,742 B2 | 10/2019 | Prendki et al. | |
| 10,460,728 B2 | 10/2019 | Anbazhagan et al. | |
| 10,497,361 B1 | 12/2019 | Rule et al. | |
| 10,554,590 B2 | 2/2020 | Cabrera-Cordon et al. | |
| 10,554,817 B1 | 2/2020 | Sullivan et al. | |
| 10,572,879 B1 | 2/2020 | Hunter et al. | |
| 10,601,992 B2 | 3/2020 | Dwyer et al. | |
| 10,636,425 B2 | 4/2020 | Naughton et al. | |
| 10,718,031 B1 | 7/2020 | Wu et al. | |
| 10,742,806 B2 | 8/2020 | Kotak | |
| 10,750,019 B1 | 8/2020 | Petrovykh et al. | |
| 10,783,568 B1 | 9/2020 | Chandra et al. | |
| 10,803,865 B2 | 10/2020 | Naughton et al. | |
| 10,812,654 B2 | 10/2020 | Wozniak | |
| 10,812,655 B1 | 10/2020 | Adibi et al. | |

(56) References Cited

U.S. PATENT DOCUMENTS

| | | |
|---|---|---|
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,943,589 B2 | 3/2021 | Naughton et al. |
| 11,017,176 B2 | 5/2021 | Ayers et al. |
| 11,089,158 B1 | 8/2021 | Holland et al. |
| 2001/0008999 A1 | 7/2001 | Bull |
| 2001/0024497 A1 | 9/2001 | Campbell |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis et al. |
| 2003/0112927 A1 | 6/2003 | Brown et al. |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2005/0033957 A1 | 2/2005 | Enokida |
| 2005/0043986 A1 | 2/2005 | McConnell et al. |
| 2005/0063365 A1 | 3/2005 | Mathew et al. |
| 2005/0071178 A1 | 3/2005 | Beckstrom et al. |
| 2005/0226220 A1 | 10/2005 | Kilkki et al. |
| 2005/0271198 A1 | 12/2005 | Chin et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0277108 A1 | 12/2006 | Altberg et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121902 A1 | 5/2007 | Stoica et al. |
| 2007/0121903 A1* | 5/2007 | Moore, Jr. ............ G06Q 20/085 379/265.12 |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0263810 A1* | 11/2007 | Sterns ................. H04M 3/5233 379/142.07 |
| 2007/0265990 A1 | 11/2007 | Sidhu et al. |
| 2007/0269031 A1 | 11/2007 | Honig et al. |
| 2007/0287430 A1 | 12/2007 | Hosain et al. |
| 2008/0002823 A1 | 1/2008 | Fama et al. |
| 2008/0043976 A1 | 2/2008 | Maximo et al. |
| 2008/0095355 A1* | 4/2008 | Mahalaha ........... H04M 3/5233 379/265.09 |
| 2008/0126957 A1 | 5/2008 | Tysowski et al. |
| 2008/0205620 A1 | 8/2008 | Odinak et al. |
| 2008/0254774 A1 | 10/2008 | Lee |
| 2008/0255944 A1 | 10/2008 | Shah et al. |
| 2008/0300955 A1 | 12/2008 | Hamilton et al. |
| 2009/0018996 A1 | 1/2009 | Hunt et al. |
| 2009/0080411 A1 | 3/2009 | Lyman et al. |
| 2009/0086945 A1 | 4/2009 | Buchanan et al. |
| 2009/0110182 A1* | 4/2009 | Knight, Jr. ......... H04M 3/5233 379/265.12 |
| 2009/0171164 A1 | 7/2009 | Jung et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114646 A1 | 5/2010 | McIlwain et al. |
| 2010/0189250 A1 | 7/2010 | Williams et al. |
| 2010/0211515 A1 | 8/2010 | Woodings et al. |
| 2010/0250196 A1 | 9/2010 | Lawler et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0116618 A1* | 5/2011 | Zyarko ............... H04M 3/5158 379/266.07 |
| 2011/0125697 A1 | 5/2011 | Erhart et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0288897 A1 | 11/2011 | Erhart et al. |
| 2012/0046996 A1 | 2/2012 | Shah et al. |
| 2012/0051537 A1* | 3/2012 | Chishti ............... H04M 3/5233 379/265.11 |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead et al. |
| 2012/0290373 A1 | 11/2012 | Ferzacca et al. |
| 2012/0300920 A1* | 11/2012 | Fagundes ............. H04M 3/523 379/265.05 |
| 2012/0321073 A1 | 12/2012 | Flockhart et al. |
| 2013/0023235 A1 | 1/2013 | Fan et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0236002 A1 | 9/2013 | Jennings et al. |
| 2013/0304581 A1 | 11/2013 | Soroca et al. |
| 2014/0012603 A1 | 1/2014 | Scanlon et al. |
| 2014/0039944 A1 | 2/2014 | Humbert et al. |
| 2014/0079195 A1 | 3/2014 | Srivastava et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1* | 6/2014 | Baranovsky ........ H04M 3/5232 379/142.05 |
| 2014/0177819 A1 | 6/2014 | Vymenets et al. |
| 2014/0200988 A1 | 7/2014 | Kasskoet et al. |
| 2014/0219438 A1* | 8/2014 | Brown ............... H04M 3/5191 379/265.09 |
| 2014/0233719 A1 | 8/2014 | Vyemenets et al. |
| 2014/0254790 A1 | 9/2014 | Shaffer et al. |
| 2014/0257908 A1 | 9/2014 | Steiner et al. |
| 2014/0270138 A1 | 9/2014 | Uba et al. |
| 2014/0270142 A1 | 9/2014 | Bischoff et al. |

(56) References Cited

U.S. PATENT DOCUMENTS

| | | |
|---|---|---|
| 2014/0278605 A1 | 9/2014 | Borucki et al. |
| 2014/0278649 A1 | 9/2014 | Guerinik et al. |
| 2014/0279045 A1 | 9/2014 | Shottan |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0010134 A1 | 1/2015 | Erel et al. |
| 2015/0012278 A1 | 1/2015 | Metcalf et al. |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman et al. |
| 2015/0127677 A1 | 5/2015 | Wang et al. |
| 2015/0172463 A1 | 6/2015 | Quast et al. |
| 2015/0213454 A1 | 7/2015 | Vedula |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1* | 10/2015 | Milstein .......... G06Q 10/063112 379/265.12 |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350443 A1 | 12/2015 | Kumar et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1* | 2/2016 | Hollenberg ......... H04M 3/5233 379/265.12 |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1* | 2/2016 | Nagpal ................. H04M 3/323 379/266.07 |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford et al. |
| 2016/0155080 A1 | 6/2016 | Gnanasambandam et al. |
| 2016/0173692 A1 | 6/2016 | Wicaksonoet al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1* | 6/2016 | Bouzid ............... H04M 3/5232 379/265.12 |
| 2016/0234386 A1* | 8/2016 | Wawrzynowicz ...... H04L 51/14 |
| 2016/0247165 A1 | 8/2016 | Ryabchun et al. |
| 2016/0300573 A1 | 10/2016 | Carbune et al. |
| 2016/0335576 A1 | 11/2016 | Peng |
| 2016/0358611 A1 | 12/2016 | Abel |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0024762 A1 | 1/2017 | Swaminathan |
| 2017/0032436 A1 | 2/2017 | Disalvo et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | McGann et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0169325 A1* | 6/2017 | McCord ............... H04M 3/5233 |
| 2017/0207916 A1 | 7/2017 | Luce et al. |
| 2017/0220966 A1 | 8/2017 | Wang |
| 2017/0286774 A1 | 10/2017 | Gaidon |
| 2017/0316386 A1 | 11/2017 | Joshi et al. |
| 2017/0323344 A1 | 11/2017 | Nigul et al. |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1* | 12/2017 | Stoops .................. H04L 67/141 |
| 2018/0018705 A1 | 1/2018 | Tognetti |
| 2018/0032997 A1 | 2/2018 | Gordon et al. |
| 2018/0053401 A1 | 2/2018 | Martin et al. |
| 2018/0054464 A1 | 2/2018 | Zhang et al. |
| 2018/0061256 A1 | 3/2018 | Elchik et al. |
| 2018/0077250 A1 | 3/2018 | Prasad et al. |
| 2018/0114234 A1 | 4/2018 | Fighel |
| 2018/0121766 A1 | 5/2018 | McCord et al. |
| 2018/0137555 A1 | 5/2018 | Clausse et al. |
| 2018/0150749 A1 | 5/2018 | Wu et al. |
| 2018/0165062 A1 | 6/2018 | Yoo et al. |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0248818 A1 | 8/2018 | Zucker et al. |
| 2018/0260857 A1 | 9/2018 | Kar et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300641 A1 | 10/2018 | Donn et al. |
| 2018/0309801 A1 | 10/2018 | Rathod |
| 2018/0349858 A1 | 12/2018 | Walker |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2019/0013017 A1 | 1/2019 | Kang et al. |
| 2019/0028587 A1 | 1/2019 | Unitt et al. |
| 2019/0028588 A1* | 1/2019 | Shinseki ................ G06Q 10/10 |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0108834 A1 | 4/2019 | Nelson et al. |
| 2019/0130329 A1 | 5/2019 | Fama et al. |
| 2019/0132443 A1 | 5/2019 | Munns et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0182383 A1 | 6/2019 | Shaev et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso et al. |
| 2019/0342450 A1 | 11/2019 | Kulkarni et al. |
| 2019/0349477 A1 | 11/2019 | Kotak et al. |
| 2019/0377789 A1 | 12/2019 | Jegannathan et al. |
| 2019/0378076 A1 | 12/2019 | O'Gorman et al. |
| 2019/0386917 A1 | 12/2019 | Malin |
| 2019/0392357 A1 | 12/2019 | Surti et al. |
| 2019/0394333 A1 | 12/2019 | Jiron et al. |

(56) References Cited

U.S. PATENT DOCUMENTS

| | | | |
|---|---|---|---|
| 2020/0007680 A1 | 1/2020 | Wozniak | |
| 2020/0012697 A1 | 1/2020 | Fan et al. | |
| 2020/0012992 A1 | 1/2020 | Chan et al. | |
| 2020/0019893 A1 | 1/2020 | Lu | |
| 2020/0050996 A1 | 2/2020 | Generes et al. | |
| 2020/0118215 A1 | 4/2020 | Rao et al. | |
| 2020/0119936 A1 | 4/2020 | Balasaygun et al. | |
| 2020/0125919 A1 | 4/2020 | Liu et al. | |
| 2020/0126126 A1 | 4/2020 | Briancon et al. | |
| 2020/0134492 A1 | 4/2020 | Copeland | |
| 2020/0134648 A1 | 4/2020 | Qi et al. | |
| 2020/0154170 A1 | 5/2020 | Wu et al. | |
| 2020/0175478 A1 | 6/2020 | Lee et al. | |
| 2020/0193335 A1 | 6/2020 | Sekhar et al. | |
| 2020/0193983 A1 | 6/2020 | Choi et al. | |
| 2020/0211120 A1 | 7/2020 | Wang et al. | |
| 2020/0218766 A1 | 7/2020 | Yaseen et al. | |
| 2020/0219500 A1 | 7/2020 | Bender et al. | |
| 2020/0242540 A1 | 7/2020 | Rosati et al. | |
| 2020/0250557 A1 | 8/2020 | Kishimoto et al. | |
| 2020/0257996 A1 | 8/2020 | London | |
| 2020/0280578 A1 | 9/2020 | Hearty et al. | |
| 2020/0280635 A1* | 9/2020 | Barinov | G06Q 30/01 |
| 2020/0285936 A1 | 9/2020 | Sen | |
| 2020/0329154 A1* | 10/2020 | Baumann | H04M 3/5175 |
| 2020/0336567 A1 | 10/2020 | Dumaine et al. | |
| 2020/0351375 A1 | 11/2020 | Lepore et al. | |
| 2020/0357026 A1 | 11/2020 | Liu | |
| 2020/0364507 A1 | 11/2020 | Berry | |
| 2020/0365148 A1 | 11/2020 | Ji et al. | |
| 2021/0004536 A1 | 1/2021 | Adibi et al. | |
| 2021/0005206 A1 | 1/2021 | Adibi et al. | |
| 2021/0056481 A1 | 2/2021 | Wicaksono et al. | |
| 2021/0067627 A1 | 3/2021 | Delker et al. | |
| 2021/0081869 A1 | 3/2021 | Zeelig et al. | |
| 2021/0081955 A1 | 3/2021 | Zeelig et al. | |
| 2021/0082417 A1 | 3/2021 | Zeelig et al. | |
| 2021/0082418 A1 | 3/2021 | Zeelig et al. | |
| 2021/0084149 A1 | 3/2021 | Zeelig et al. | |
| 2021/0089762 A1 | 3/2021 | Rahimi et al. | |
| 2021/0091996 A1 | 3/2021 | McConnell et al. | |
| 2021/0105361 A1* | 4/2021 | Bergher | H04M 3/5183 |
| 2021/0124843 A1 | 4/2021 | Vass et al. | |
| 2021/0125275 A1 | 4/2021 | Adibi et al. | |
| 2021/0133763 A1 | 5/2021 | Adibi et al. | |
| 2021/0133765 A1 | 5/2021 | Adibi et al. | |
| 2021/0134282 A1 | 5/2021 | Adibi et al. | |
| 2021/0134283 A1 | 5/2021 | Adibi et al. | |
| 2021/0134284 A1 | 5/2021 | Adibi et al. | |
| 2021/0136204 A1 | 5/2021 | Adibi et al. | |
| 2021/0136205 A1 | 5/2021 | Adibi et al. | |
| 2021/0136206 A1 | 5/2021 | Adibi et al. | |

FOREIGN PATENT DOCUMENTS

| | | |
|---|---|---|
| WO | 2012024316 A2 | 2/2012 |
| WO | 2015099587 A1 | 7/2015 |
| WO | 2019142743 A1 | 7/2019 |

OTHER PUBLICATIONS

An et al., Towards Automatic Persona Generation Using Social Media Aug. 2016, IEEE 4th International conference on Future Internet of Things and Cloud Workshops (FiCloudW), 2 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Buesing et al., "Getting the Best Customer Service from your IVR: Fresh eyes on an old problem," [online] Mckinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Business Wire, "Rockwell SSD announces Call Center Simulator", Feb. 4, 1997, 4 pages.

Chiu et al., "A multi-agent infrastructure for mobile workforce management in a service oriented enterprise", Proceedings of the 38th annual Hawaii international conference on system sciences, IEEE, 2005, pp. 10.

dictionary.com, "Marketing", URL: https://www.dictionary.com/browse/marketing, Apr. 6, 2019, 7 pages.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al., "Staff scheduling and rostering: A review of applications, methods and models," European Journal of Operational Research, 2004, vol. 153, pp. 3-27.

Fan et al., "Demystifying Big Data Analytics for Business Intelligence Through the Lens of Marketing Mix", Big Data Research, vol. 2, Issue 1, Mar. 2015, 16 pages.

Federal Register, vol. 72, No. 195, Oct. 10, 2007, pp. 57526-57535.

Federal Register, vol. 75, No. 169, Sep. 1, 2010, pp. 53643-53660.

Federal register, vol. 79, No. 241 issued on Dec. 16, 2014, p. 74629, col. 2, *Gottschalk v. Benson*.

Federal Register, vol. 84, No. 4, Jan. 7, 2019, pp. 50-57.

Federal Register, vol. 84, No. 4, Jan. 7, 2019, p. 53-55.

Feldman et al., "Staffing of Time-Varying Queues to Achieve Time-Stable Performance", Management Science, Feb. 2008, vol. 54, No. 2, Call Center Management, pp. 324-338.

Fukunaga et al., "Staff Scheduling for Inbound Call Centers and Customer Contact Centers", AI Magazine, Winter, vol. 23, No. 4, 2002, pp. 30-40.

Gaietto, Molly., "What is Customer DNA?",—NGDATA Product News, Oct. 27, 2015, 10 pages.

Grefen et al., "A reference architecture for workflow management systems", Data & Knowledge Engineering, 1998, vol. 27, No. 1, pp. 31-57.

https://www.uspto.gov/patent/laws-and-regulations/examination-policy/examination- guidelines-training-materials-view-ksr, signed Aug. 20, 2010.

Huang et al., "Agent-based workflow management in collaborative product development on the Internet." Computer-Aided Design; 2000; vol. 32; pp. 133-144.

Janarthanam, "Hands on Chatbots and conversational UI development: Build chatbots and voice user interfaces with Chatfuel, Dialogflow, Microsoft Bot Framework, Twilio, and Alexa Skills" Dec. 2017.

Mandelbaum et al., "Staffing Many-Server Queues with Impatient Customers: Constraint Satisfaction in Call center", Operations Research, Sep.-Oct. 2009, vol. 57, No. 5 (Sep.-Oct. 2009), pp. 1189-1205.

Mehrotra et al., "Call Center Simulation Modeling: Methods, Challenges, and Opportunities" Proceedings of the 2003 Winter Simulation Conference, vol. 1, 2003, pp. 135-143.

Myers et al., "At the Boundary of Workflow and AI", Proc. AAAI 1999 Workshop on Agent-Based Systems in The Business Context, 1999, 09 pages.

Nathan, Steams., "Using skills-based routing to the advantage of your contact center", Customer Inter@ction Solutions, Technology Marketing Corporation, May 2001, vol. 19 No. 11, pp. 54-56.

Niven, "Can music with prosocial lyrics heal the working world? A field intervention in a call center." Journal of Applied Social Psychology, 2015; 45(3), 132-138. doi:10.1111/jasp.12282 ).

On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).

Ponn et al., "Correlational Analysis between Weather and 311 Service Request Volume", eil.mie.utoronto.ca., 2017, 16 pages.

Twin, Alexandra., "Marketing", URL: https://www.investopedia.com/lerms/m/marketing.asp, Mar. 29, 2019, 5 pages.

U.S. Appl. No. 16/668,214, Non-Final Office Action mailed Nov. 10, 2021.

(56) References Cited

OTHER PUBLICATIONS

U.S. Appl. No. 16/668,215, Non-Final Office Action mailed Dec. 7, 2021.
Van Den Bergh et al. "Personnel scheduling: A literature review", European journal of operational research, 2013, vol. 226, No. 3 pp. 367-385.
Zhang et al., "A Bayesian approach for modeling and analysis of call center arrivals", 2013 Winter Simulations conference (WSC), ieeexplore_ieee.org, pp. 713-723.

* cited by examiner

SYSTEMS AND METHODS FOR RECOMMENDING RULES FOR ROUTING CALLS

BACKGROUND

In a contact center calls are received and routed to available agents. One common way to route calls to agents, is to place agents in different queues that each correspond to a different call topic or subject matter. For example, agents that that are to handle technical support calls may be placed in the technical support queue and agents that are to handle billing questions may be placed in the billing queue. When a call is received with a billing question the next agent in the billing queue is selected to handle the call.

However, there are drawbacks associated with this approach. In particular, using agent queues may result in an inefficient use of agent resources. For example, a contact center may receive many billing related calls and therefore the billing queue may be full. However, there may be many agents in the technical support queue who would be able to handle the calls, but because they are not in the billing queue they are idle.

SUMMARY

In one embodiment, an entity such as a company may desire to use agents associated with a contact center to handle calls for the company. The company may identify customer categories for the calls such as technical support and billing. Rather than have the company create the rules that are used to select agents to handle calls for each category, the contact center may use historical call data, such as historical performance metrics and historical customer satisfaction survey information, to recommend rules to the company for each customer category. The recommended rules may also be based on the specific industry, field, or sector associated with the company.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described within a cloud-based contact center, it will become evident to those skilled in the art that the implementations are not limited thereto.

Figure 1:
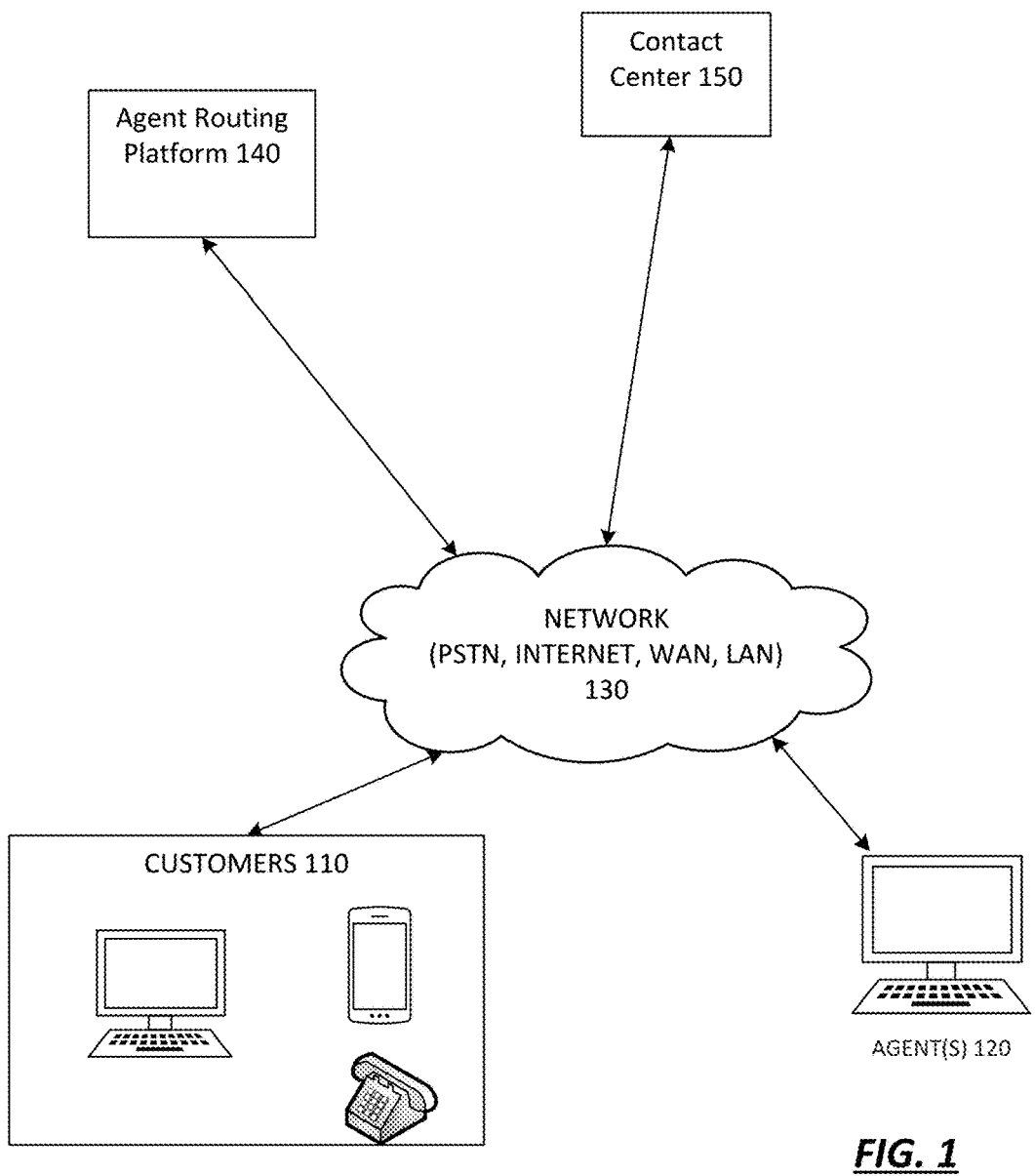
FIG. 1 is an illustration of an example system architecture.

FIG. 1 is an example system architecture 100, and illustrates example components, functional capabilities and optional modules that may be included in a cloud-based contact center infrastructure solution. Customers 110 interact with a contact center 150 using voice, email, text, and web interfaces in order to communicate with agent(s) 120 through a network 130 and one or more of text or multimedia channels. The agent(s) 120 may be remote from the contact center 150 and handle communications with customers 110 on behalf of an enterprise. The agent(s) 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

Agent(s) 120 and customers 110 may communicate with each other and with other services over the network 130. For example, a customer calling on telephone handset may connect through the PSTN and terminate on a private branch exchange (PBX). A video call originating from a tablet may connect through the network 130 terminate on the media server. A smartphone may connect via the WAN and terminate on an interactive voice response (IVR)/intelligent virtual agent (IVA) components. IVR are self-service voice tools that automate the handling of incoming and outgoing calls. Advanced IVRs use speech recognition technology to enable customers to interact with them by speaking instead of pushing buttons on their phones. IVR applications may be used to collect data, schedule callbacks and transfer calls to live agents. IVA systems are more advanced and utilize artificial intelligence (AI), machine learning (ML), advanced speech technologies (e.g., natural language understanding (NLU)/natural language processing (NLP)/natural language generation (NLG)) to simulate live and unstructured cognitive conversations for voice, text and digital interactions. In yet another example, Social media, email, SMS/MMS, IM may communicate with their counterpart's application (not shown) within the contact center 150.

The contact center 150 itself be in a single location or may be cloud-based and distributed over a plurality of locations. The contact center 150 may include servers, databases, and other components. In particular, the contact center 150 may include, but is not limited to, a routing server, a SIP server, an outbound server, a reporting/dashboard server, automated call distribution (ACD), a computer telephony integration server (CTI), an email server, an IM server, a social server, a SMS server, and one or more databases for routing, historical information and campaigns.

The ACD is used by inbound, outbound and blended contact centers to manage the flow of interactions by routing and queuing them to the most appropriate agent. Within the CTI, software connects the ACD to a servicing application (e.g., customer service, CRM, sales, collections, etc.), and looks up or records information about the caller. CTI may display a customer's account information on the agent desktop when an interaction is delivered. Campaign management may be performed by an application to design, schedule, execute and manage outbound campaigns. Campaign management systems are also used to analyze campaign effectiveness.

For inbound SIP messages, the routing server may use statistical data from reporting/dashboard information and a routing database to the route SIP request message. A response may be sent to the media server directing it to route the interaction to a target agent 120. The routing database may include: customer relationship management (CRM) data; data pertaining to one or more social networks (including, but not limited to network graphs capturing social relationships within relevant social networks, or media updates made by members of relevant social networks); agent skills data; data extracted from third party data sources including cloud-based data sources such as CRM; or any other data that may be useful in making routing decisions.

The integration of real-time and non-real-time communication services may be performed by unified communications (UC)/presence sever. Real-time communication services include Internet Protocol (IP) telephony, call control, instant messaging (IM)/chat, presence information, realtime video and data sharing. Non-real-time applications include voicemail, email, SMS and fax services. The communications services are delivered over a variety of communications devices, including IP phones, personal computers (PCs), smartphones and tablets. Presence provides real-time status information about the availability of each person in the network, as well as their preferred method of communication (e.g., phone, email, chat and video).

Recording applications may be used to capture and play back audio and screen interactions between customers and agents. Recording systems should capture everything that happens during interactions and what agents do on their desktops. Surveying tools may provide the ability to create and deploy post-interaction customer feedback surveys in voice and digital channels. Typically, the IVR/IVA development environment is leveraged for survey development and deployment rules. Reporting/dashboards are tools used to track and manage the performance of agents, teams, departments, systems and processes within the contact center. Reports are presented in narrative, graphical or tabular formats. Reports can be created on a historical or real-time basis, depending on the data collected by the contact center applications. Dashboards typically include widgets, gadgets, gauges, meters, switches, charts and graphs that allow role-based monitoring of agent and contact center performance. Unified messaging (UM) applications include various messaging and communications media (voicemail, email, SMS, fax, video, etc.) stored in a common repository and accessed by users via multiple devices through a single unified interface.

In order to improve the routing of calls to agents 120, the calls (or other communications) received by the contact center 150 may be routed to agents 120 by an agent routing platform 140. While shown in FIG. 1 as separate from the contact center 150, depending on the embodiment the agent routing platform 140 may be part of the contact center 150.

The agent routing platform 140 may route calls to agents 120 based on attributes associated with each agent 120, and one or more rules. As used herein an attribute may be a skill or characteristic associated with an agent 120. Examples of attributes may include language attributes (e.g., what languages that the agent speaks), work-related attributes (e.g., the agent 120 is trained to answer calls related to technical support, or billing, returns, shipping, etc.), and attributes representing any accolades or achievements that the agent 120 may have received (e.g., has the agent 120 been rewarded for providing excellent service). In some embodiments, each attribute may be associated with a proficiency score.

A rule for routing a call may specify a plurality of required attributes and may provide a minimum proficiency score for one or more of the specified attributes. For example, a sample rule may specify that an agent 120 have an attribute of "technical support" and an attribute of "speaks Chinese" with a proficiency level greater than or equal to four. A call associated with such a rule may only be routed to an agent 120 that has the attribute "technical support" and speaks Chinese with a proficiency level that is greater than or equal to four.

In some embodiments, the agent routing platform 140 may associate rules with customer categories and may route calls according to the customer category associated with a call or customer. Examples of customer categories may include the language spoken by a customer, the country associated with a customer, the type of service requested by the customer (e.g., tech support or billing), and a priority associated with the customer (e.g., is the customer a VIP?).

Figure 2:
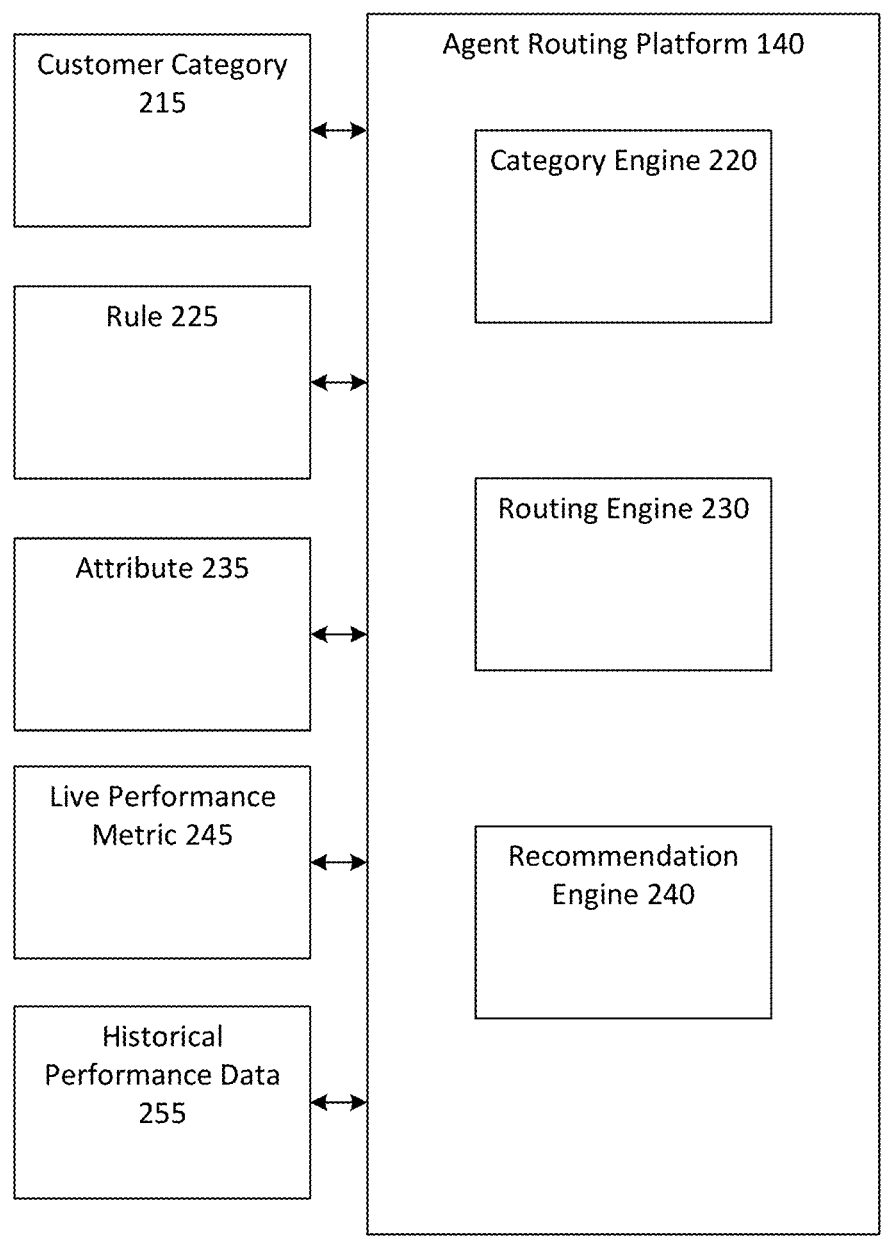
FIG. 2 is an illustration of an example agent routing platform.

FIG. 2 is an illustration of an example agent routing platform 140. As shown the agent routing platform 140 includes various modules including a category engine 220, a routing engine 230, and a recommendation engine 240. More or fewer modules may be supported by the agent routing platform 140. Depending on the embodiment, each of the agent routing platform 140, category engine 220, routing engine 230, and recommendation engine 240 may be implemented together or separately by one or more general purpose computing devices such as the computing system 500 illustrated with respect to FIG. 5.

The category engine 220 may receive calls from customers 110 for a particular entity or company and may associate the call with a customer category 215. As used herein a customer category may be a set of characteristics that are associated with a customer 110 of a call. The characteristics may include country of origin (i.e., what country is the call coming from), language (i.e., what language is spoken by the customer 110), call topic or purpose (i.e., what type of help is the customer seeking), and customer priority 110 (e.g., is the customer a VIP or does the customer pay for support). Other types of characteristics may be supported.

Depending on the embodiment, the customer engine 220 may determine the customer category for a call using call information indicating the country of origin associated with the call and other call routing information provided by the contact center 150. The category engine 220 may further determine the customer category using IVR information associated with the call. For example, the customer may have selected an option indicating the language that they speak (e.g., English or Spanish) and the type of information that they are seeking (e.g., tech support vs. billing). Depending on the embodiment, the received call may include a customer number or identifier provided by the contact center 150 that may be used to determine the priority or VIP status of the caller and/or the customer category.

The routing engine 230 may, for each customer category 215, route calls associated with the customer category 215 to one or more agents 120 based on one or more rules 225 associated with the customer category 215 and one or more attributes associated with each agent 120. The routing engine 230 may select a call for a customer category 215 and may retrieve one or more rules 225 associated with the customer category 215. The routing engine 230 may retrieve the one or more rules 225 from a rule storage associated with the agent routing platform 140 and/or the contact center 150. Depending on the embodiment, if no rules 225 are associated with the customer category, the routing engine 230 may route the call to any available agent 120. Alternatively, the routing engine 230 may select an agent 120 using a default or catchall rule 225. The default rule 225 may be set by a user or administrator, for example.

After retrieving the rules 225, the routing engine 230 may determine agents 120 that have attributes 235 that satisfy the rules 225. The routing engine 230 may retrieve the attributes 235 associated with each available agent 120 (i.e., an agent 120 that is not currently on a call or otherwise unavailable) and may determine available agents 120 that satisfy the rules 225. The routing engine 130 may then route the call to one of the determined agents 120.

The routing engine 230 may continuously select calls and may route the selected calls to agents 120 that have attributes 235 that satisfy the rules 225 associated with the categories 215. In some implementations, each category 215 may have an instance of the routing engine 230 that routes calls to agents 120 based on the rules 225 associated with that category 215.

The recommendation engine 240 may monitor one or more performance metrics 245 associated with each customer category 215 or the entire contact center 150. A performance metric 245 may be any metric that can be used to measure the performance or overall success of routing calls to agents 120 and/or maintaining call quality. Example performance metrics 245 may include average handling time (i.e., the average amount of time that it takes for a received call to be completed by an agent 120), average wait time (i.e., the average amount of time that a call waits to be received by an agent 120), service level, abandon rate (i.e., the number of calls that are abandoned before they are handled by an agent 120), and average customer satisfaction (i.e., an average based on responses to customer satisfaction surveys). Other performance metrics 245 may be supported.

In some embodiments, the performance metrics 245 may be based on a computer analysis of the calls between the customers 110 and the agents 120. For example, a model trained on a variety of previous agent 120 and customer 110 calls (e.g., trained using the audio data or transcripts of the calls) may generate scores or ratings for each call of the customer category 215 after it is handled by an agent 120.

In some embodiments, the recommendation engine 240 may use the performance metrics 145 to generate historical performance data 255. The historical performance data 255 may include data collected about each category 215 or entity over time including, but not limited to, the number of calls associated with the category 215, the agents 120 that handled calls for the category 215 including their associated attributes 235 and proficiency levels, rules 225 used to route calls for the category 215, and the various performance metrics 245 that were observed for the category 215. The performance metrics 245 may include performance metrics 245 related to the performance of calls associated with the category 215 (e.g., average hold time and abandonment rate) and performance metrics 245 related to the agents 120 that handled calls for the category 215 (e.g., customer satisfaction surveys).

Depending on the embodiment, the historical performance data 255 may be used to train a model that can predict the performance metrics 245 based on criteria such as the available agents 120 and associated attributes 235, the rules 225, a sector or business, and a current call volume received by the contact center 150, for example.

The recommendation engine 240 may further be configured to recommend rules 225 to associate with a customer category 215 based on historical performance data 225. For example, an entity, such as a corporation or company, may begin using the contact center 150 to handle calls for the entity. The entity may desire to have customer categories 215 corresponding to different business divisions (e.g., technical support and billing), different languages, and different counties of origin. The entity may further desire to have customer categories 215 corresponding to different languages or countries of its customers 110.

After the entity creates or selects its customer categories 215, the recommendation engine 240 may use the historical performance data 255 to recommend, for each customer category 215, a rule 225 that may be used by the entity to select agents 120 to handle calls associated with the customer category. As described above, the historical performance data 255 may include the rules 225 (including attributes 235 and proficiency levels) used for various customer categories 215 of the contact center 150 as well as the measured performance metrics 245 for the customer categories 215 over time.

In some implementations, the recommendation engine 240, when determining a rule 225 to recommend for a customer category, may consider the historical performance data 255 associated with similar customer categories. In addition, the recommendation engine 240 may determine the sector (e.g., business type or industry) associated with the entity. The recommendation engine 240 may then consider the historical performance data 255 associated with customer categories 215 that are associated with other entities in the same general sector.

In some implementations, the recommendation engine 240 may use the model trained using the historical performance data 245 to recommend a rule 225 for each customer category 215 proposed by the entity. The model may be used to predict the performance metrics 235 for a category 215, and associated rules 225, based on factors such as the sector associated with the entity, and the number of agents 120 assigned to the contact center 150. The recommendation engine 240 may then recommend a rule 255 for a customer category 215 that has the highest predicted performance metrics 235 for the customer category 215 and sector.

For example, when an entity determines to use a contact center 150 to handle calls for the entity, the recommendation engine 240 may present an administrator associated with the entity with a GUI through which the administrator may create customer categories. Depending on the embodiment, the recommendation engine 240 may initially recommend customer categories 215 based on the customer categories 215 used by other entities in the same or similar sector. Thus, if the entity is a clothing retailer, the recommendation engine 240 may recommend similar customer categories 215 as used by other entities that are also retailers.

After selecting one or more of the customer categories in the GUI (or after creating their own customer categories), the recommendation engine 240 may use the model and/or the historical performance data 255 to recommend a rule 225 for each of the customer categories 215. Continuing the above example, where the entity is a retailer and the customer categories are "returns" and "orders", the recommendation engine 240 may retrieve historical performance data 255 associated other retail entities and customer categories that are similar to "returns" and "orders". The recommendation engine 240 may then use the historical performance data 255 to determine rules 225, and combinations of attributes 235, that were associated with high performance metrics 245 for customer categories similar to "returns" and "orders".

The recommendation engine 240 may present the determined rule 255 for each customer category 215 to the administrator in the GUI. Each determined rule 255 may be presented with its associated attributes 235 and predicted performance metrics 245. The administrator may then accept each of the presented rules 225 or may modify the attributes 235 of a recommended rule 225 using tools provided in the GUI. If the administrator changes an attribute 235 of a rule 225, the recommendation engine 240 may display re-predicted performance metrics 245 for the rule 225 based on the changed attribute 235. The administrator may then use the GUI to associate the presented, or modified, rules 225 with the customer category 215. The agent routing platform 140 may then begin routing calls to agents 120 for the entity based on the rules 225 associated with the customer categories 215.

Figure 3:
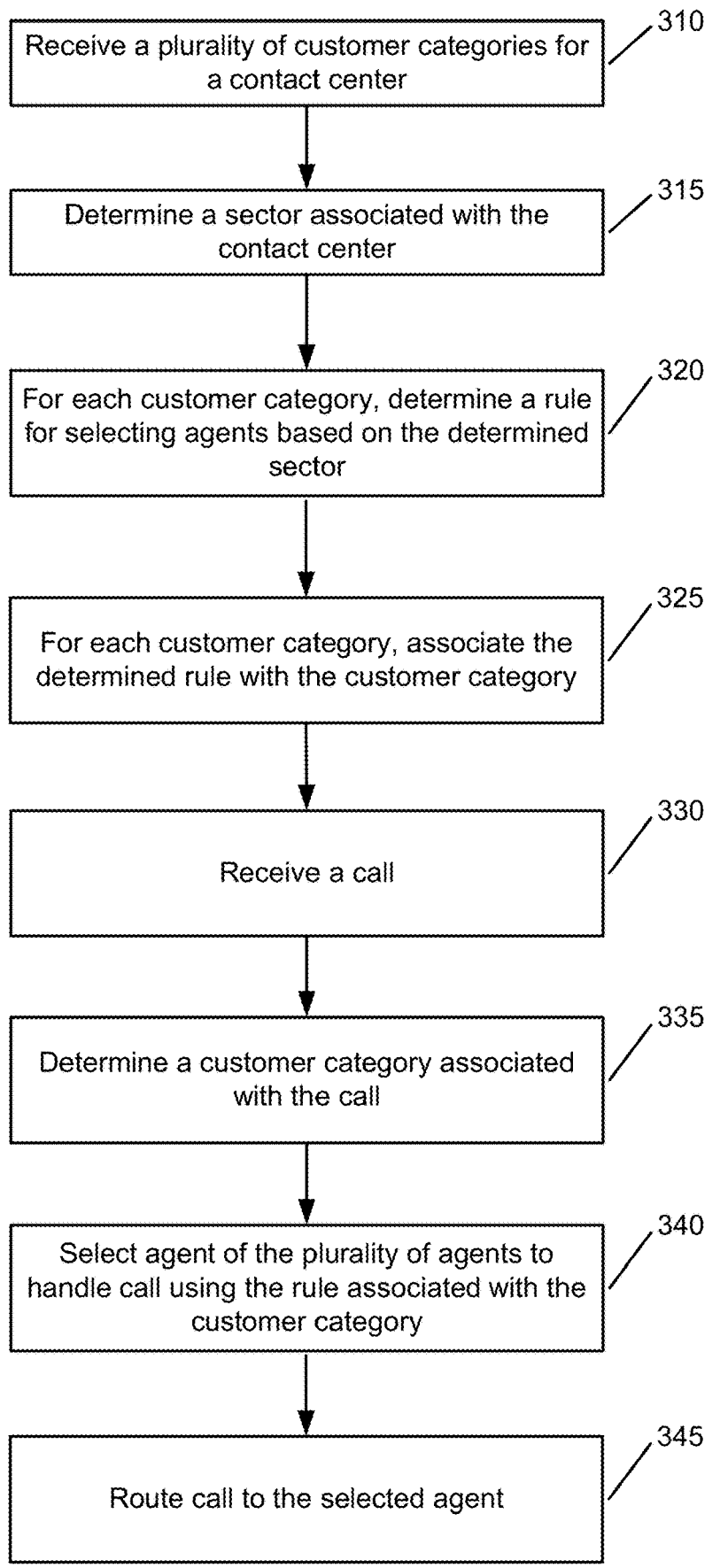
FIG. 3 is an illustration of an example method for recommending rules for routing calls to agents for a plurality of customer categories.

FIG. 3 is an illustration of an example method 300 for determining a rule 225 for a plurality of customer categories for a contact center 150 based on historical performance data 255. The method 300 may be implemented by the agent routing platform 140.

At 310, a plurality of customer categories for a contact center is received. The customer categories may be received by the recommendation engine 240 of the agent routing platform 140. The contact center 150 may be associated with an entity such as a company or corporation.

At 315, a sector associated with the contact center is determined. The sector may be determined by the recommendation engine 240. The sector may be the industry or field associated with the entity that is using the contact center 150 to handle calls.

At 320, for each customer category, a rule for selecting agents based on the determined sector is determined. The rule 225 for selecting agents 120 for a contact center 150 may be determined by the recommendation engine 240. In some implementations, the determination may be a recommendation that is based on historical performance data 255 that was collected about other customer categories 215 and the rules 225 that were used to route calls to agents 120 for those customer categories 215. The historical performance data 255 may be limited to historical performance data 255 that was collected about customer categories 215 of entities that are associated with the same, or similar, sector as the determined sector.

At 325, for each customer category, the determined rule is associated with the customer category. The determined rule 225 may be associated with the customer category 215 by the category engine 220 of the agent routing platform 140.

At 330, a call is received. The call may be received by the routing engine 230 from a customer 110. The customer 110 may have called the contact center 150.

At 335, a customer category associated with the call is determined. The customer category 215 may be determined by the routing engine 230. The customer category may be determined by information associated with the call and/or customer 110 such as country of origin, language spoken, and purpose of call, for example.

At 340, an agent of a plurality of agents is selected to handle the call using the rule associated with the customer category. The agent 120 may be selected by the routing engine 230 using the rule 225 associated with the customer category 215.

At 345, the call is routed to the selected agent. The call may be routed to the agent 120 by the routing engine 230.

Figure 4:
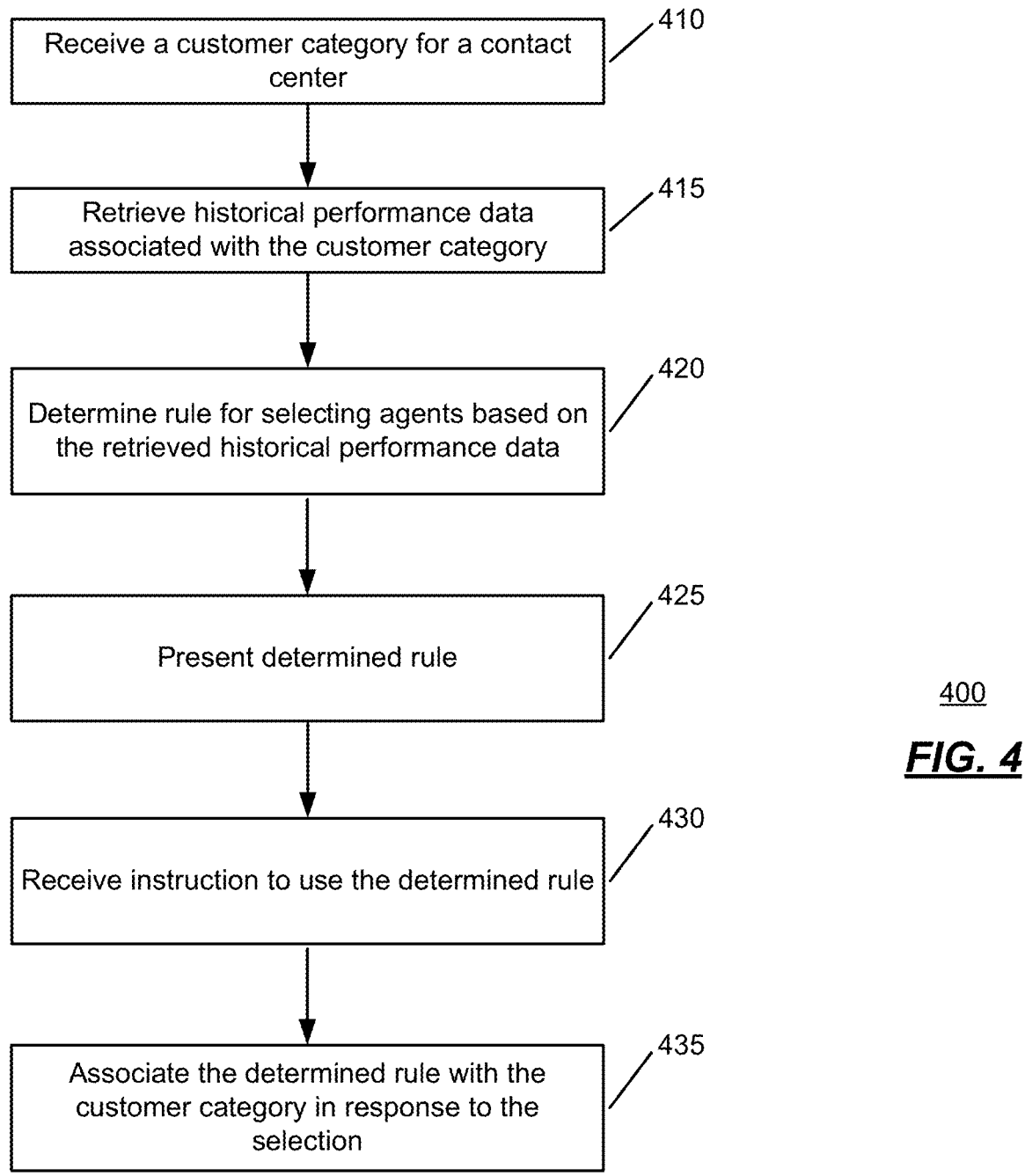
FIG. 4 is an illustration of an example method for recommending a rule for routing calls to agents.

FIG. 4 is an illustration of an example method 400 for determining a rule 225 for a customer category for a contact center based on historical performance data 255. The method 400 may be implemented by the agent routing platform 140.

At 410, a customer category for a contact center is received. The customer category 215 may be received by the recommendation engine 240 through a GUI, for example. The customer category 215 may be provided by an entity that will use the contact center to handle calls for the entity. The entity may be a company or business, for example. The entity may be associated with a particular industry or sector of the economy such as clothing, computer or technology, healthcare, etc.

At 415, historical performance data associated with the customer category is retrieved. The historical performance data 255 may be a collection of performance metrics 245 recorded over time for the received customer category 215. The historical performance data 255 may have been collected from different entities than the entity that provided the customer category 215 through the GUI. The historical performance data 255 may further include the various rules 235 and agents 120 that were used when the various performance metrics 245 were recorded.

At 420, a rule for selecting agents based on the retrieved historical performance data is determined. The rule 235 may be determined by the recommendation engine 240. The recommendation engine 240 may use the historical performance data 255 to select or create a rule 225 that will likely to be successful for the entity with respect to the customer category 215. The rule 225 may be used by the routing engine 230 to select agents 120 to handle calls associated with the customer category 215. Each rule 225 may include a plurality of attributes 235. The recommendation engine 240 may use the historical performance engine 255 to select the attributes 235 that are most associated with performance metrics 245 that satisfy or exceed relayed performance metric thresholds. The recommendation engine 240 may further consider information such as the number of agents 120 that are associated with the contact center 150 and/or the entity.

Depending on the embodiment, the recommendation engine 240 may use the historical performance data 255 to train a model that can predict the performance metrics 245 for rules 225 based on factors such as the attributes 235 associated with the rules 255, the attributes 235 associated with each agent 120, the number of agents 120, and the associated sector. The recommendation engine 230 may then use the model to recommend or determine a rule 225 for the entity.

At 425, the determined rule is presented. The determined rule 225 may be presented to the entity in the GUI.

At 430, an instruction to use the determined rule is received. The instruction may be received by the recommendation engine 240 from the entity through the GUI.

At 435, the determined rule is associated with the customer category. The determined rule 225 may be associated with the customer category 215 by the category engine 220 of the agent routing platform 140.

Figure 5:
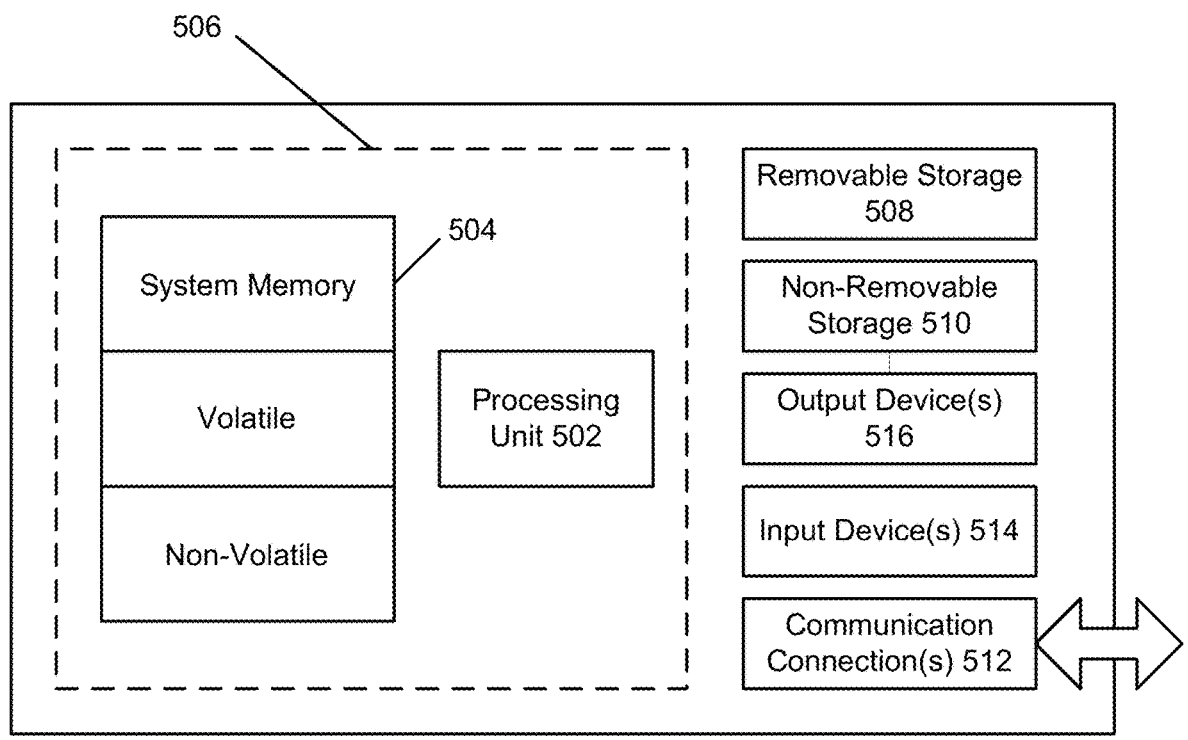
FIG. 5 illustrates an example computing device.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used.

Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of tangible computer readable media. Computer readable media can be any available tangible media that can be accessed by device 500 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for associating communication routing rules with customer categories, the communication routing rules being used in a contact center to handle communications for an entity that is using the contact center to manage communications, the method comprising:
    receiving a plurality of customer categories for a contact center by a computing device;
    determining, by a computing device, a business sector associated with the entity that is using the contact center to manage communications;
    for each customer category of the plurality of customer categories, a computing device determining a specific communication routing rule for selecting agents of a plurality of agents to handle communications associated with the customer category based on historical performance data associated with other entities in the same business sector;
    for each customer category, a computing device recommending the specific communication routing rule for the customer category;
    for each customer category receiving an instruction to use the specific communication routing rule for the customer category in response to the recommending the specific communication routing rule; and
    for each customer category, associating the specific communication routing rule with the customer category in a memory device of an agent routing platform to thereby apply the specific communication routing rule for routing communications in the customer category.

2. The method of claim 1, further comprising:
    receiving a communication;

determining a customer category associated with the communication;

selecting an agent of the plurality of agents to handle the communication using the specific communication routing rule associated with the customer category; and routing the communication to the selected agent.

3. The method of claim 2, wherein the customer category is determined based one or more of a language spoken by a customer associated with the call, a country associated with the customer, and a priority associated with the customer.

4. The method of claim 1, wherein determining the specific communication routing rule for selecting agents of a plurality of agents to handle calls associated with the customer category based on the determined business sector comprises:

retrieving historical performance data associated with the business sector and customer category.

5. The method of claim 1, wherein the specific communication routing rule comprises a plurality of attributes.

6. The method of claim 1, further comprising determining the plurality of customer categories based on the business sector.

7. A system for associating communication routing rules with customer categories, the communication routing rules being used in a contact center to handle communications for an entity that is using the contact center to manage communications, the system comprising:

at least one processor; and a non-transitory computer readable medium comprising instructions that, when executed by the at least one processor, cause the system to:

receive a plurality of customer categories for a contact center;

determine a business sector associated with he the entity that is using the contact center to manage communications;

for each customer category of the plurality of customer categories, determine a specific communication routing rule for selecting agents of a plurality of agents to handle communications associated with the customer category based on historical performance data associated with other entities in the same business sector for each customer category, recommend the specific communication routing rule for the customer category;

for each customer category receive an instruction to use the specific communication routing rule for the customer category in response to the recommending the specific communication routing rule; and for each customer category, associate the specific communication routing rule with the customer category in a memory device of an agent routing platform to thereby apply the specific communication routing rule for routing communications in the customer category.

8. The system of claim 7, further comprising instructions that, when executed by the at least one processor, cause the system to:

receive a communication;

determine a customer category associated with the communication;

select an agent of the plurality of agents to handle the communication using the specific communication routing rule associated with the customer category; and route the communication to the selected agent.

9. The system of claim 8, wherein the customer category is determined based one or more of a language spoken by a customer associated with the call, a country associated with the customer, and a priority associated with the customer.

10. The system of claim 7, wherein determining the rule for selecting agents of a plurality of agents to handle communications associated with the customer category based on the determined business sector comprises:

retrieving historical performance data associated with the business sector and customer category.

11. The system of claim 7, wherein the specific communication routing rule comprises a plurality of attributes.

12. The system of claim 7, further comprising determining the plurality of customer categories based on the business sector.

13. A non-transitory computer-readable medium comprising instructions that, when executed by at least one processor, cause a computer system to:

receive a plurality of customer categories for a contact center;

determine a business sector associated with an entity that is using the contact center to manage communications;

for each customer category of the plurality of customer categories, determine a specific communication routing rule for selecting agents of a plurality of agents to handle communications associated with the customer category based on historical performance data associated with other entities in the determined business sector;

for each customer category, recommend the specific communication routing rule for the customer category;

for each customer category receive an instruction to use the specific communication routing rule for the customer category in response to the recommending the specific communication routing rule; and for each customer category of the plurality of customer categories, associate the specific communication routing rule with the customer category in a memory device of an agent routing platform to thereby apply the specific communication routing rule for routing communications in the customer category.

14. The non-transitory computer-readable medium of claim 13, further comprising instructions that, when executed by the at least one processor, cause the computer system to:

receive a communication;

determine a customer category associated with the communication;

select an agent of the plurality of agents to handle the communication using the specific communication routing rule associated with the customer category; and route the communication to the selected agent.

15. The non-transitory computer-readable medium of claim 14, wherein the customer category is determined based one or more of a language spoken by a customer associated with the communication, a country associated with the customer, and a priority associated with the customer.

16. The non-transitory computer-readable medium of claim 13, wherein determining the rule for selecting agents of a plurality of agents to handle communications associated with the customer category based on the determined business sector comprises:

retrieving historical performance data associated with the business sector and customer category.

17. The non-transitory computer-readable medium of claim 13, wherein the specific communication routing rule comprises a plurality of attributes.

\* \* \* \* \*